UNITED STATES PATENT OFFICE.

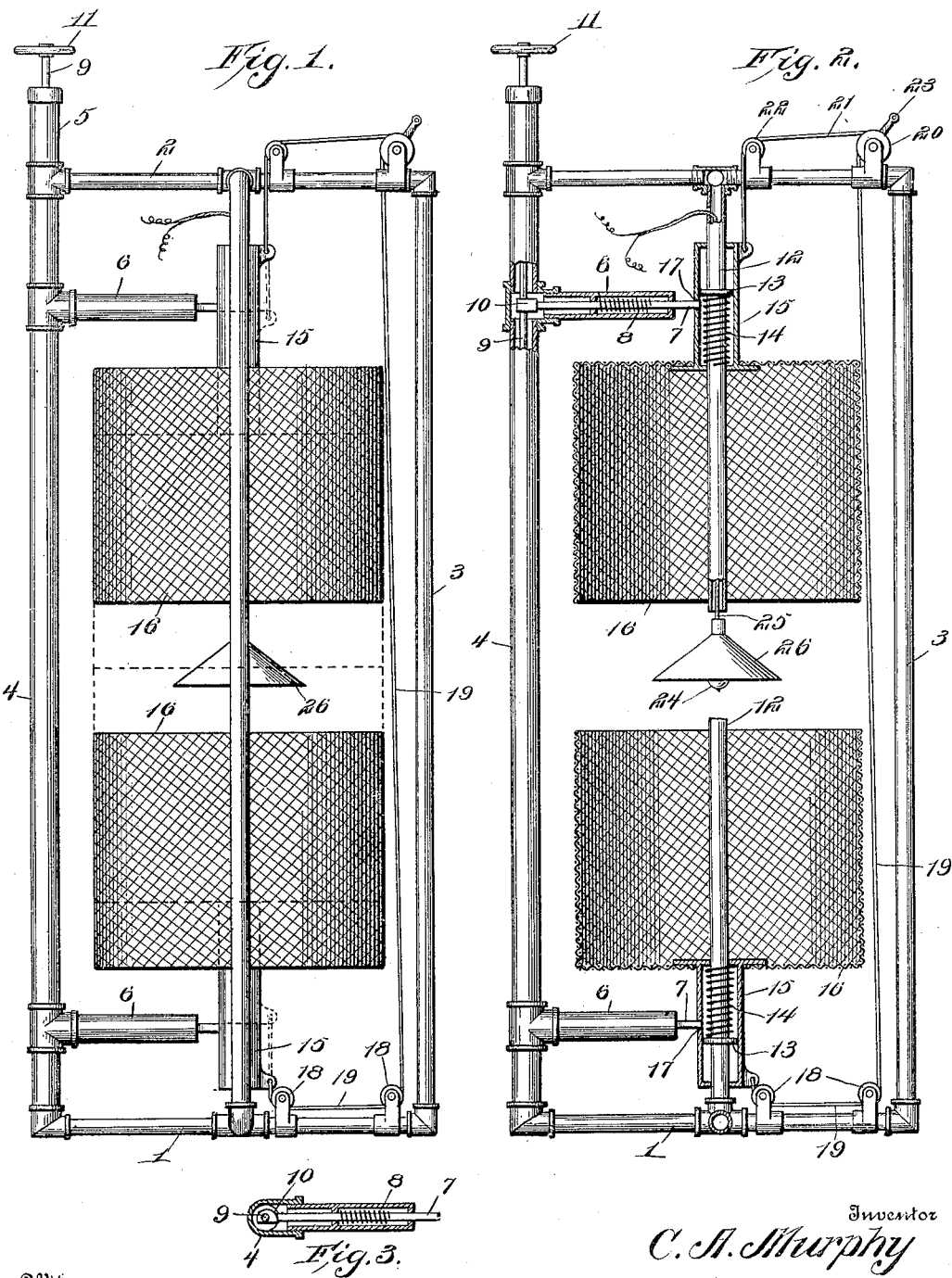

COLONEL ASA MURPHY, OF CHATFIELD, MINNESOTA.

TRAP.

No. 822,543.  Specification of Letters Patent.  Patented June 5, 1906.

Application filed September 27, 1905. Serial No. 280,359.

*To all whom it may concern:*

Be it known that I, COLONEL ASA MURPHY, a citizen of the United States, residing at Chatfield, in the county of Fillmore and State of Minnesota, have invented certain new and useful Improvements in Traps; and I do hereby declare the following to be a full, clear, and exact description of the invention, such as will enable others skilled in the art to which it appertains to make and use the same.

My invention relates to traps for fish and crustacea; and its object is to provide a device of this character adapted to be submerged and which is formed of spring-controlled members adapted to be simultaneously closed when desired.

Another object is to provide a trap with a light which is so disposed therein as to render the contents of the trap visible without at the same time permitting the fish, &c., to see the operator.

With the above and other objects in view, the invention consists of a suitable frame in which are mounted oppositely-movable trap members which are spring-controlled and have means for locking them normally apart. Means are also employed whereby the members of the trap can be simultaneously released. Suspended within the trap is an electric light which is so shaded as to direct the light-rays downward.

The invention also consists of certain other novel features of construction and combination of parts, which will be hereinafter more fully described, and pointed out in the claims.

In the accompanying drawings I have shown the preferred form of my invention.

In said drawings, Figure 1 is a side elevation of the complete trap. Fig. 2 is a vertical section therethrough, one of the plunger-casings being shown in section; and Fig. 3 is a horizontal section through the plunger-casing.

Referring to the figures by numerals of reference, 1 1 are pipes secured to each other at right angles and constituting the base of the trap, and on the outer end of each of these pipes is an upright which is connected to the outer end of another set of pipes 2, which are secured at right angles to each other and constitute the top of the frame. These uprights are indicated by the numerals 3 and 4, respectively. The uprights 3 are substantially similar in size, whereas the upright 4 is considerably larger than the others and has a tubular extension 5 at its upper end. Sleeves 6 extend toward the center of the frame from the upright 4 near each end, and on each sleeve is mounted a plunger 7, which projects beyond the end of the sleeve and is normally pressed, by means of a spring 8, toward the center of the upright 4. Rotatably mounted within the upright 4 and extending through the extension 5 thereon is a rod 9, having eccentrics 10 secured to it in alinement with the plungers 7. The springs 8 hold the plungers normally in contact with the eccentrics, and when these eccentrics are turned the plungers will be projected toward or will move from the center of the frame. Rod 9 is preferably provided with a hand-wheel 11, whereby the same may be readily rotated. Extending inwardly from the centers of the base and top of the frame are guide-tubes 12, which terminate at points adjacent the center of the frame. Each of these tubes has a collar 13 near its fixed end, and a spring 14 bears upon the collar and upon one end of a sleeve 15, which is slidably mounted on the tube 12. This sleeve has a basket 16, preferably of wire-netting, fastened to it and surrounding the tube 12. The two baskets when brought together constitute a closed trap-body; but when they are in their raised and lowered positions, respectively, considerable space is formed between the two baskets, said space being sufficient to allow a fish or crustacean to enter the trap. Each sleeve has a recess or aperture 17, which is adapted to be engaged by one of the plungers 7 when the trap is open. Pulleys 18 are secured to the base of the trap, and extending under them is a cable 19, which is fastened to the lower sleeve 15. This cable extends upward to a drum 20, mounted on the top of the frame, and another cable 21 extends from said drum over a pulley 22 on the top of the frame down to the upper sleeve 15. Drum 20 is adapted to be rotated in any suitable manner, as by means of a crank 23, and an incandescent electric lamp 24 is suspended at the center of the trap by wires 25, which project through the upper guide-tube 12 to a suitable source of electricity. A shade 26 is mounted on this lamp and serves to direct the light-rays downward.

In using the trap the same is submerged, and a current is directed into the lamp 24. The light will attract fish and crustacea into the baskets 16, and the operator upon looking through the water and seeing them turns the hand-wheel 11 so as to rotate the eccentrics 10 away from plungers 7. The springs 8 will promptly withdraw the plungers from the apertures 17, and the compressed springs 14 will throw the baskets 16 together and imprison the fish, &c. When it is desired to reset the trap, it is merely necessary to wind the cables 19 and 21 upon the drum 20, so that the sleeves 15 and their baskets will be drawn apart. After the apertures 17 arrive in position in alinement with the plungers 7 the eccentrics 10 are again turned, so as to press the plungers into said apertures and relock the trap in opened position.

Having thus fully described my invention, what I claim as new, and desire to secure by Letters Patent, is—

1. In a trap of the character described the combination with a frame having guides therein; of oppositely-disposed baskets slidably mounted upon the guides and adapted to normally contact, and means for simultaneously moving the baskets from each other.

2. In a trap of the character described the combination with a frame; of oppositely-movable baskets mounted within the frame and constituting a trap, means for locking the baskets against movement, and automatic devices for moving the baskets together when unlocked.

3. In a trap the combination with a frame having guides therein; of oppositely-disposed baskets movably mounted on the guides, locks for holding the baskets against movement, means for automatically moving the baskets together when unlocked, and mechanism for moving the baskets apart.

4. In a trap the combination with a frame having guides therein; of oppositely-disposed spring-pressed baskets mounted on the guides and normally contacting at their open ends, means for separating the baskets, and simultaneously-movable locks for holding the baskets apart.

5. In a trap the combination with a frame having guides therein; of oppositely-disposed spring-pressed baskets mounted on the guides and normally contacting at their open ends, means for separating the baskets, locks for engaging and holding the baskets, and means for simultaneously actuating the locks.

6. In a trap the combination with a frame having guides therein; of a lamp, oppositely-disposed baskets movable upon the guides and normally inclosing the lamp, and means for simultaneously moving the baskets in opposite directions.

7. In a trap the combination with a frame having guides therein and a lamp; of oppositely-disposed baskets mounted upon the guides and normally inclosing the lamp, sleeves secured to the baskets and slidably mounted on the guides, springs within the sleeves normally holding the baskets in contact, means for compressing the springs and separating the baskets, and locks for holding said baskets separated.

8. In a trap the combination with a frame having guides therein and a lamp; of oppositely-disposed baskets mounted upon the guides and normally inclosing the lamp, sleeves secured to the baskets and slidably mounted on the guides, springs within the sleeves normally holding the baskets in contact, means for compressing the springs and separating the baskets, locks for holding said baskets separated, and means for simultaneously actuating the locks to release or lock the baskets.

9. The combination with a trap having oppositely-disposed baskets spaced apart and means for simultaneously bringing the baskets together; of an electric lamp within the baskets and adapted to be submerged therewith.

10. In a trap of the character described, the combination with oppositely-disposed slidable baskets and means for holding the baskets normally spaced apart; of means for simultaneously moving said baskets toward each other.

11. In a trap of the character described, the combination with guides; of oppositely-disposed baskets slidably mounted on the guides, means for holding the baskets spaced apart, and means for simultaneously moving said baskets toward each other.

In testimony whereof I have signed my name to this specification in the presence of two subscribing witnesses.

COLONEL ASA MURPHY.

Witnesses:
F. T. WRIGHT,
S. E. BIBBINS.